J. M. HANSEN.
CAR WHEEL.
APPLICATION FILED JUNE 4, 1910.
1,007,947.
Patented Nov. 7, 1911.
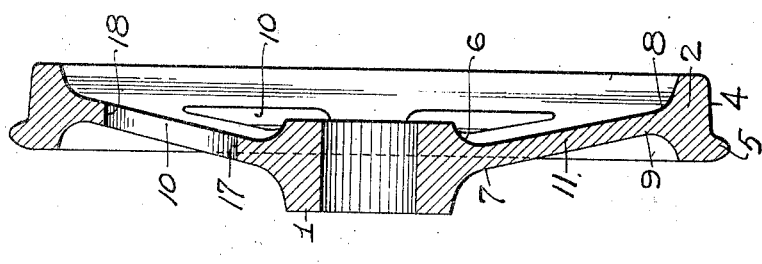
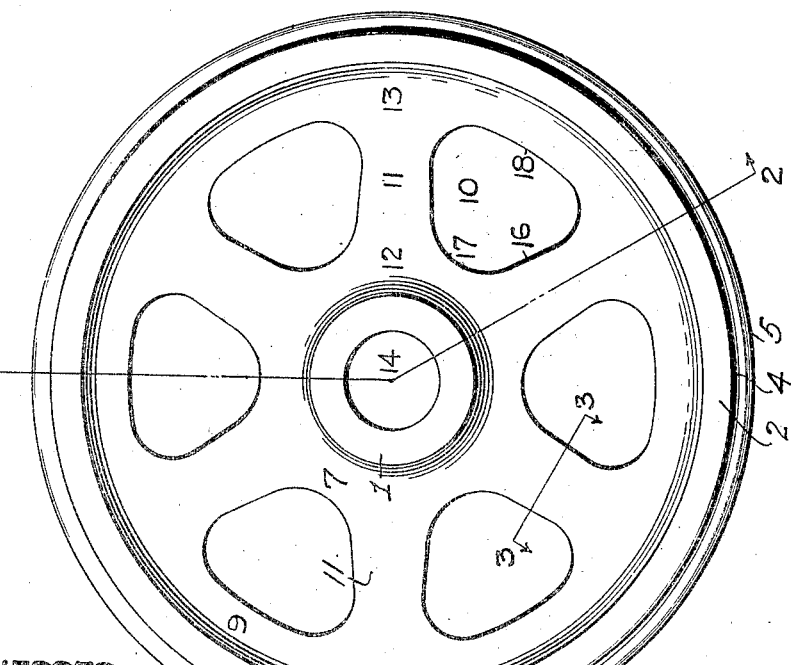
WITNESSES.
INVENTOR.

UNITED STATES PATENT OFFICE.

JOHN M. HANSEN, OF PITTSBURGH, PENNSYLVANIA.

CAR-WHEEL.

1,007,947.   Specification of Letters Patent.   Patented Nov. 7, 1911.

Application filed June 4, 1910. Serial No. 565,026.

*To all whom it may concern:*

Be it known that I, JOHN M. HANSEN, a resident of Pittsburgh, in the county of Allegheny and State of Pennsylvania, have invented a new and useful Improvement in Car-Wheels; and I do hereby declare the following to be a full, clear, and exact description thereof.

My invention relates to forged steel car wheels, and more directly to that class of such wheels used in connection with street cars and other like cars carrying light loads such as in electric service.

As a matter of safety in carrying loads, and ease of running and for like reasons, it has become very desirable to employ forged steel wheels because of the greater strength of the wheel flanges to resist shocks and jars and the longer life of the wheels. A very important requirement for such forged steel wheels is lightness in weight, as any material reduction in weight produces a like economy in cost of running, it being calculated in the present service on electric roads that each hundred pounds saving in weight effects a saving of from five to ten dollars per year.

While it has been recognized that the necessary hub, rim and flange for wheels used in electric and like car service could be obtained in a light weight forged steel wheel, great difficulty has been experienced in providing therewith a light weight web; even if it can be forged to provide a light weight web of sufficient stiffness. One main reason for this is found in the difficulty of forging a thin web corresponding to the usual proportions of the wheel body, because the metal of the web portion being thinner than the hub and rim is subjected to much heavier forging action and cools much more rapidly in the forging operation and becomes too stiff for forging if made much thinner than that required in the heavier standard wheel for steam railroad service. Another difficulty is that if the web is thinned in like proportion to the rest of the wheel body as compared to the regular section of such standard, the web strength of the wheel and its stiffness are so impaired as to be brought below the safety limit of wheels of this type.

The object of the present invention is to provide an integral forged steel car wheel of relatively light-weight mid-section and yet one with sufficient stiffness in its mid-section to sustain the desired load.

It consists, generally stated, in an integral forged steel car wheel having hub and rim sections connected by a series of spokes, said spokes being of the same thickness at equal distances from the wheel axis and having shear-finished edge walls parallel to the wheel axis; it being found practicable to produce such wheel by forging the wheel with the ordinary thickness of web section employed in standard wheels and then so shearing out the middle of the web section as to form the spokes. It also consists in such a wheel dished to bring the hub and rim out of line with each other and connected by a series of spokes formed of the same thickness at equal distances from the wheel axis and having shear-finished edge walls parallel to the wheel axis. It also consists in such a wheel having hub and rim portions tapering toward the web and having continuous web portions close to the hub and rim and intermediate spoke sections of the same thickness at equal distances from the wheel axis and having said web sheared out to form spokes connecting such web portions and of increasing the width where the spokes are joined to such web portions.

In the accompanying drawing Figure 1 is a plan view of a wheel embodying the invention; Fig. 2 is a vertical section on the line 2—2 Fig. 1; and Fig. 3 is a cross section on line 3—3 Fig. 1.

The car wheel embodying the invention is an integral forged steel wheel having the hub 1 and the rim 2, and is forged from a suitable blank by suitable forging mechanism such as by dies or dies and rolls. The rim 2 is formed with the tread face 4 and the flange 5 and said flange is made of full thickness so as to provide in the integral forged wheel a sufficient thickness of flange to withstand all strains brought upon it. In the preferred form of said wheel the hub tapers down as illustrated at 6 to join onto the web 7 and the inner face of the rim tapers down as illustrated at 8 to join onto said web as at 9, the metal being joined at such points on the regular curve as usually employed in the standard wheel. In the preferred form the web portions 7 and 9 are continuous close to the hub and web, extending outwardly from the hub and inwardly from the rim a short distance, while said web is sheared out to form a series of openings 10, so forming the spoke portions 11, said spoke portions being connected to the web portions 7 near the hub and to the web portion 9 near the rim on curved lines so forming the spokes wider at each end than in the mid-portion, as illustrated at 12 and 13.

In the ordinary forging of the wheel the web is made of the same thickness at equal distances from the wheel axis 14, the wheel being forged as with even thickness of web walls along circumferential lines and being slightly tapering as shown. The web is, however, made of full thickness of wall; that is, though in the forging of the wheel the hub and rim are reduced in weight, the rim has full thickness of flange so as to sustain all the flange or lateral strains brought on the wheel, and it has a relatively thick web, the web being of sufficient thickness to provide for easy forging thereof, it being preferred for example that a web shall be made of a thickness not less than three-fourths of an inch near the rim of the wheel. In the shearing of the wheel as so forged a large body of the metal is sheared out on lines parallel with the wheel axis, leaving the spokes 11 of the same thickness at equal distances from the wheel axis and with shear-edge faces 16 which form the spokes practically rectangular in shape as clearly shown in Fig. 3. While, however, the wheel is dished so that the hub is out of line with the rim as in the standard forged wheel, the edges or walls of the sheared out portion are parallel to the wheel axis so that the blank can be sheared on lines vertical to the face of the wheel body, as at 17 and 18. The edge walls or faces 16, 17 and 18 show the lines or shearing or punching. The wheel as thus constructed provides the full thickness of wheel flange to sustain all necessary strain and also the full thickness of spokes to give the full strength and stiffness to sustain all the loads brought upon the wheel, while the web portion of the wheel can be reduced to approximately ½ the weight of a continuous or solid web of the same thickness. For example, where the continuous web would have a weight of about 130 to 140 pounds, the sheared out spoke-web would have a weight of approximately 65 to 70 pounds, a very material reduction being obtained in the weight of the entire wheel such as in an ordinary swivel truck car, which makes a reduction of over 500 pounds per car. Notwithstanding such reduction in weight the wheel has full strength and stiffness to carry the load because of the thickness of the web and the spokes formed therefrom, and such strength is increased because of the continuous web portions 7 and 9 close to the hub and rim respectively and also because of the increased width of the spokes where they connect onto such webs, the web portion close to the hub receiving the load therefrom which is equally distributed through the spokes to the web portion close to the rim, enabling the rim to sustain the entire load and providing sufficient stiffness in the mid-portion of the wheel proper although it is dished to sustain the full load carried by this type of wheel. I am also enabled to easily forge a wheel of such section because the necessity of thinning the web portion to reduce the weight of the wheel is entirely overcome.

The wheel can be cheaply and rapidly formed by forging the wheel with continuous dished web and then simultaneously shearing through the web on lines parallel to the wheel axis while still at a sufficiently high heat to provide for the easy shearing through of the thick web to produce the thick spoke-web portions as above described. And I so produce a wheel of such reduced weight as to cause a large saving in traction cost, or the cost of hauling the cars.

What I claim is:

1. As a new article of manufacture, an integral wrought steel car wheel, having hub and rim portions tapering toward the mid-portion and spokes of less thickness than the hub and rim but of the same thickness at equal distances from the wheel axis, and provided with shear-finished edge walls.

2. As a new article of manufacture, an integral wrought steel car wheel having hub and rim portions dished with relation to each other, and spokes of less thickness than the hub and rim and of the same thickness at equal distances from the wheel axis and provided with shear-finished edge walls parallel to the axis of the wheel.

3. As a new article of manufacture, an integral wrought steel car wheel having hub and rim portions and narrow continuous web portions joining the same and spoke portions connecting such web portions, such web and spoke portions being of the same thickness at equal distances from the wheel axis and provided with shear finished edge walls.

In testimony whereof, I the said JOHN M. HANSEN, have hereunto set my hand.

JOHN M. HANSEN.

Witnesses:
ROBERT C. TOTTEN,
JOHN F. WILL.